United States Patent
Huang et al.

(10) Patent No.: US 8,719,427 B2
(45) Date of Patent: May 6, 2014

(54) EFFICIENCY FOR NETWORK GROUP COMMUNICATION

(71) Applicant: Huawei Technologies Co., Ltd., Guangdong (CN)

(72) Inventors: Cheng Huang, Shenzhen (CN); Lunjian Mu, Shenzhen (CN); Yonggang Bian, Nanjing (CN); Yongjing Zhang, Nanjing (CN); Lei Jin, Nanjing (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 14/010,324

(22) Filed: Aug. 26, 2013

(65) Prior Publication Data
US 2013/0346504 A1  Dec. 26, 2013

Related U.S. Application Data

(63) Continuation of application No. PCT/CN2011/079178, filed on Aug. 31, 2011.

(30) Foreign Application Priority Data
Feb. 25, 2011 (CN) .......................... 2011 1 0046939

(51) Int. Cl.
G06F 15/16 (2006.01)
(52) U.S. Cl.
USPC ............................. 709/227; 709/238; 370/310
(58) Field of Classification Search
USPC ................ 709/200–205, 217–227, 228, 238; 370/310, 328
See application file for complete search history.

(56) References Cited

U.S. PATENT DOCUMENTS
7,031,700 B1 * 4/2006 Weaver et al. ................ 455/420
(Continued)

FOREIGN PATENT DOCUMENTS
CN    1539249 A    10/2004
(Continued)

OTHER PUBLICATIONS

ITU-T H.245, "Series H: Audiovisual and Multimedia Systems; Infrastructure of audiovisual services Communication procedures; Control protocol for multimedia communication," May, 2011, total 348 pages.
Search report issued in corresponding Chinese patent application No. 201110046939.8, dated Apr. 9, 2012, total 18 pages.
3GPP TR 23.888 V1.0.0, "3rd Generation Partnership Project; Technical Specification Group Services and System Aspects; System Improvements for Machine-Type Communications (Release 10)," dated Jul. 2010, total 80 pages.
(Continued)

Primary Examiner — Moustafa M Meky
(74) Attorney, Agent, or Firm — Huawei Technologies Co., Ltd.

(57) ABSTRACT

A group communication method is provided, including: receiving, from a network application, a group access request that requests access to a group, where the group access request includes a group identifier of the group; obtaining group member information of all group members in the group according to the group identifier; according to the group member information, determining members of a first group that are connected to a service function entity through a same gateway in the group; and sending, to the gateway, a first group member access request that requests access to the members of the first group. In addition, a service function entity for group communication and a gateway for group communication are provided. The present invention is capable of reducing signaling overhead during group communication and thereby improving group communication efficiency.

39 Claims, 12 Drawing Sheets

(56) References Cited

U.S. PATENT DOCUMENTS

| | | | |
|---|---|---|---|
| 7,573,837 B1* | 8/2009 | Mangal et al. | 370/260 |
| 7,620,413 B2* | 11/2009 | Jen | 455/518 |
| 7,693,534 B1* | 4/2010 | Lundy et al. | 455/518 |
| 7,822,185 B2* | 10/2010 | Nguyen et al. | 379/202.01 |
| 7,882,194 B2* | 2/2011 | Lingafelt et al. | 709/207 |
| 7,991,419 B2* | 8/2011 | Matsumoto et al. | 455/518 |
| 7,996,463 B2* | 8/2011 | Mousseau et al. | 709/204 |
| 8,284,748 B2* | 10/2012 | Borghei | 370/338 |
| 8,521,820 B2* | 8/2013 | McQuaide et al. | 709/205 |
| 2006/0025125 A1* | 2/2006 | Hong et al. | 455/422.1 |
| 2006/0235981 A1 | 10/2006 | Westman et al. | |
| 2008/0009303 A1* | 1/2008 | Westman et al. | 455/518 |
| 2009/0157798 A1 | 6/2009 | Laumen et al. | |
| 2010/0296637 A1 | 11/2010 | Shenxuezhi et al. | |
| 2012/0042026 A1* | 2/2012 | Park et al. | 709/206 |

FOREIGN PATENT DOCUMENTS

| | | |
|---|---|---|
| CN | 1735190 A | 2/2006 |
| CN | 1756389 A | 4/2006 |
| CN | 1848978 A | 10/2006 |
| CN | 101137128 A | 3/2008 |
| CN | 101895849 A | 11/2010 |
| CN | 102130773 A | 7/2011 |

OTHER PUBLICATIONS

First office action issued in corresponding Chinese patent application No. 201110046939.8, dated May 30, 2012, and English translation thereof, total 18 pages.

International Search Report & Written Opinion issued in corresponding PCT application No. PCT/CN2011/079178, dated Nov. 3, 2011, total 4 pages.

Draft ETSI TS 102.921 V<0.2.1>, "Machine-to-Machine communications (M2M); mIa, dIa and mId interfaces," dated Jan. 2011, total 32 pages.

Draft ETSI TS 102 690 V0.10.4, "Machine-to-Machine communications (M2M); Functional architecture," dated Jan. 2011, total 201 pages.

Open Mobile Alliance: "White paper on M2M standardization", OMA-WP-M2M_Standardization, Oct. 29, 2010, total 29 pages.

LGE: "Group management in GwMO", OMA-DM-GwMo, Aug. 27, 2010, total 12 pages.

Open Mobile Alliance: "Gateway management object technical specification", OMA-TS-GwMO-V1, Jan. 17, 2011, total 38 pages.

European Search Report issued in corresponding European application No. 11859028.0-1862, dated Apr. 4, 2013, total 9 page.

* cited by examiner

EFFICIENCY FOR NETWORK GROUP COMMUNICATION

CROSS-REFERENCE TO RELATED APPLICATIONS

This application is a continuation of International Application No. PCT/CN2011/079178, filed on Aug. 31, 2011, which claims priority to Chinese Patent Application No. 201110046939.8, filed on Feb. 25, 2011, both of which are hereby incorporated by reference in their entireties.

FIELD OF THE INVENTION

The present invention relates to the communications field, and in particular, to a group communication management methods, apparatuses, computer program products, and systems that allow for group communication in the communications field.

BACKGROUND OF THE INVENTION

M2M is short for "machine to machine (Machine to Machine)" or "man to machine (Man to Machine)" communication, and mainly refers to transferring information by using a "communication network" to implement data exchange from a machine to another machine or from a man to a machine, that is, implementing interconnection and interworking between machines by using the communication network. On a mobile communication network, a terminal side does not require manual cabling because of the particularity of the network. Therefore, mobility support may be provided, which helps reduce costs and may meet communication requirements in a dangerous environment. Therefore, an M2M service using the mobile communication network as a bearer arouses industry-wide concern and is widely used in fields such as security detection, mechanical service and repair business, public transport system, fleet management, industrial automation, and city informatization.

To centrally manage M2M devices and M2M applications, a network application creates an M2M group on an M2M platform. The network applications include authorized entities such as an electric power company, a taxi company, and an environment monitoring department. The M2M group may be an industry application group, for example, a metering terminal group, a vehicle-mounted device group, or a sensor group. According to different capabilities and deployment positions of terminals, group members (MEMBERs) in the group may directly access the platform, and may also access the platform through different gateways; in addition, according to different service features of the terminals, the group members in the group may perform access from a fixed position, and a position change or an access point handover may also occur.

When an authorized entity requests access to the group members in the group, the platform may deliver an access request to all of the group members according to a group definition. After receiving the request, all of the group members return a response, where the response may include returned data and changed status. However, in group communication, the number of group members may be extremely large. Therefore, if the M2M platform delivers the requests to all of the group members, a high signaling overhead may be caused, thereby affecting group communication efficiency. For example, for the electric power company application that needs to collect electricity consumption of thousands of users in several residential communities, after receiving a request of the electric power company application, an electric power company platform needs to deliver electricity consumption reporting requests to all of the users, and receive, from all of the users, responses respond to the request, thereby causing high overhead.

SUMMARY OF THE INVENTION

Embodiments of the present invention provide a group communication method and an apparatus for group communication, which are capable of reducing signaling overhead during group communication, thereby improving group communication efficiency.

On one aspect, an embodiment of the present invention provides a group communication method, where the method includes: receiving, from a network application, a group access request that requests access to a group, wherein the group access request comprises a group identifier of the group; obtaining group member information of all group members in the group according to the group identifier; determining, according to the group member information, members of a first group that are connected to a service function entity through a same gateway in the group; and sending, to the gateway, a first group member access request that requests access to the members of the first group.

On another aspect, an embodiment of the present invention provides a service function entity for group communication, where the service function entity includes: a first receiving module, an obtaining module, a first determining module, and a first sending module. The first receiving module, configured to receive, from a network application, a group access request that requests access to a group, wherein the group access request comprises a group identifier of the group; the obtaining module, configured to obtain group member information of all group members in the group according to the group identifier; the first determining module, configured to, according to the group member information, determine members of a first group that are connected to the service function entity through a same gateway in the group; and the first sending module, configured to send, to the gateway, a first group member access request that requests access to the members of the first group.

On still another aspect, an embodiment of the present invention provides a gateway for group communication, where the gateway includes a first receiving module and a first sending module. The first receiving module, configured to receive, from a service function entity, a first group member access request that requests access to members of a first group, wherein the members of the first group are group members that are connected to the service function entity through a same gateway in a group; and the first sending module, configured to send a third access request that requests access to all members of the first group respectively to all of the members of the first group.

Based on the foregoing technical solutions, according to the group communication method and the service function entity in the embodiments of the present invention, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

BRIEF DESCRIPTION OF THE DRAWINGS

For a better understanding of the technical solutions in the embodiments of the present invention, the accompanying drawings for illustrating the embodiments of the present invention are briefly described below. Apparently, the accompanying drawings in the following description illustrate only some embodiments of the present invention, and a person skilled in the art may derive other accompanying drawings from these accompanying drawings without creative efforts.

DETAILED DESCRIPTION OF THE EMBODIMENTS

The technical solutions in the embodiments of the present invention are clearly and completely described below with reference to the accompanying drawings in the embodiments of the present invention. Apparently, the described embodiments are merely a part rather than all of the embodiments of the present invention. All other embodiments obtained by a person skilled in the art based on the embodiments of the present invention without creative efforts shall fall within the protection scope of the present invention.

Figure 1:
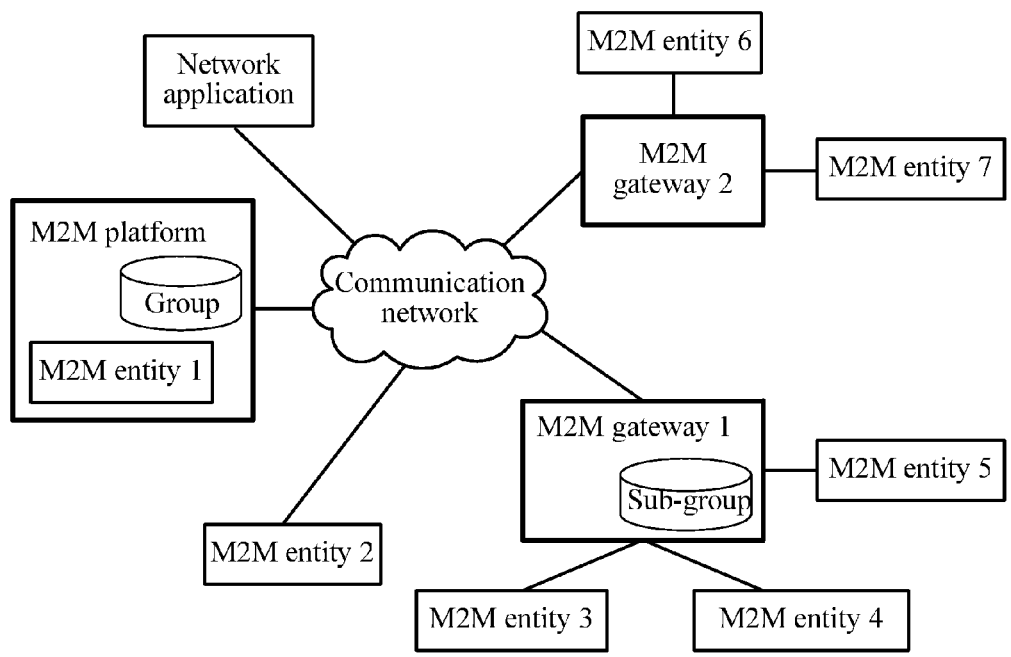
FIG. 1 is a schematic diagram of an application scenario according to an embodiment of the present invention.

FIG. 1 is a schematic diagram of an application scenario according to an embodiment of the present invention. As shown in FIG. 1, an M2M system may include an M2M platform that maintains an M2M group definition and controls M2M group services, M2M gateways that provide capabilities of connecting to the M2M platform for different M2M group members, M2M entities that serve as M2M group members, and a network application that requests an M2M group service. The M2M platform, an M2M gateway, an M2M entity, and the network application are connected to each other by using a communication network, forming the Internet of Things.

The M2M entities may adopt multiple manners to connect to the M2M platform. In an embodiment of the present invention, an M2M entity may be directly created on the M2M platform, serving as an M2M platform resource and forming a local group member in a group, for example, M2M entity 1 in FIG. 1; an M2M entity may also be directly connected to the M2M platform, for example, M2M entity 2 is FIG. 1; and an M2M entity may also be connected to the platform through an M2M gateway. As shown in FIG. 1, M2M entity 3, M2M entity 4, and M2M entity 5 are connected to the platform through M2M gateway 1, and M2M entity 6 and M2M entity 7 are connected to the platform through M2M gateway 2.

It should be understood that FIG. 1 is only a schematic diagram of an application scenario set for a better understanding of the present invention. The name, quantity, and connection relationship of all devices in the figure do not impose any restriction on this embodiment.

It should also be understood that in an embodiment of the present invention, the network application includes various application entities using the network, for example, a device entity, a device application entity, a gateway entity, a gateway application entity, and a service function entity. The service function entity includes an apparatus used to operate and maintain group members, for example, a system platform. A person skilled in the art may understand that in M2M, the network application may include an M2M entity, an M2M gateway, or a service function entity. The M2M entity may include an M2M device, an M2M device resource, or an M2M application. The service function entity may include an M2M platform, an M2M gateway, or an M2M device.

Figure 2:
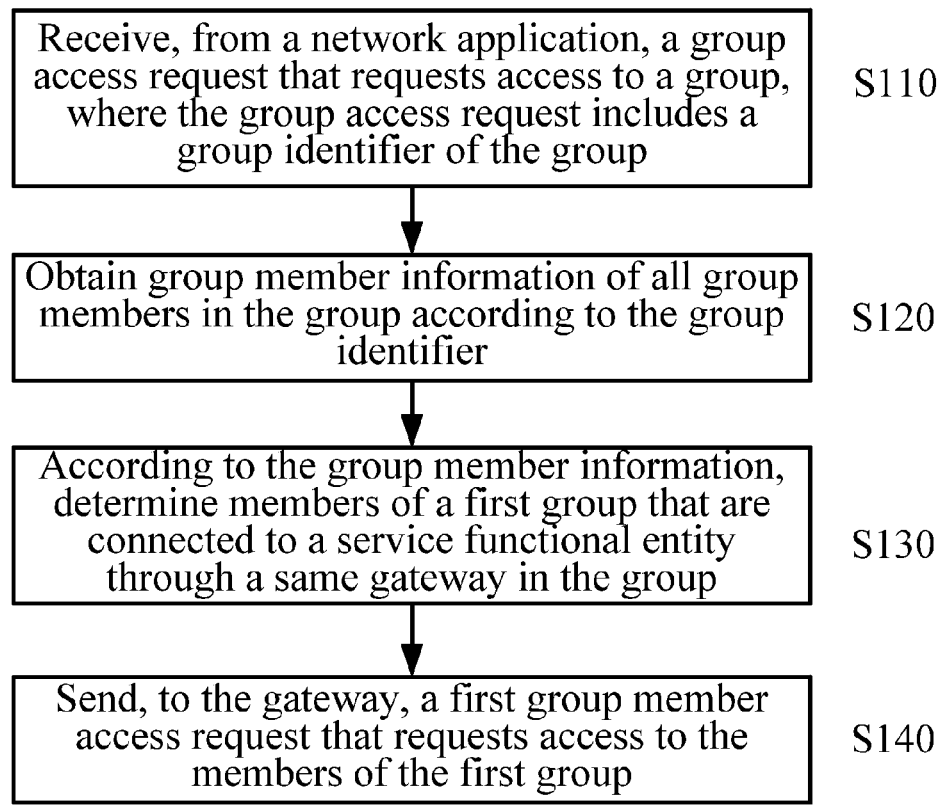
FIG. 2 is a flow chart of a group communication method according to an embodiment of the present invention.

FIG. 2 is a flow chart of a group communication method 100 according to an embodiment of the present invention. As shown in FIG. 1, the method 100 includes:

S110, receive, from a network application, a group access request that requests access to a group, where the group access request includes a group identifier of the group.

S120, obtain group member information of all group members in the group according to the group identifier.

S130, according to the group member information, determine members of a first group that are connected to a service function entity through a same gateway in the group.

S140, send, to the gateway, a first group member access request that requests access to the members of the first group.

When the network application needs to access the group, for example, when the network application needs to query data and control a status, the network application may send the group access request to the service function entity, where the group access request includes the group identifier of the group, the group access request is used to request access to the group from the service function entity, and the group access request may further include a network application identifier of the network application. In this embodiment, the access request may be, for example, a request for creation, update, deletion, acquisition, or subscription, and may also be some other access requests, for example, a request for device management of OMA DM (Open Mobile Alliance, Device Management, that is, open mobile alliance, device management) and/or device management of TR069 (that is, wide area network management protocol).

After receiving the group access request, the service function entity obtains the group member information of all group members in the group according to the group identifier, where the group member information may include information such as an identifier of a member and an access manner of the member, and the group member information may also include a device feature, and an access feature. The service function entity determines the members of a first group in the group according to the group member information, where the members of the first group are connected to the service function entity through a same gateway. For example, in the group to be accessed by the network application, one or more group members in the group that are connected to the service function entity through a first gateway are defined as the members of the first group. These members of the first group belong to the group. In addition, these members of the first group are all connected to the service function entity through the first gateway. It should be understood that for ease of description, the members of the first group in this embodiment are defined with regard to the first gateway, but the group members in the group may be connected to the service function entity through one or more gateways, and for another gateway, the group communication method according to this embodiment may also be applied, thereby reducing signaling overhead during group communication and improving group communication efficiency.

For example, with regard to a second gateway, one or more group members that are connected to the service function entity through the second gateway may also be regarded as the members of the first group. In this situation, when access to the members of the first group that correspond to the second gateway is performed, a first group member access request that requests access to the members of the first group that correspond to the second gateway is sent to the second gateway. It should be understood that, with regard to the second gateway, one or more group members that are connected to the service function entity through the second gateway may also be defined as members of a fourth group. In this case, when access to the members of the fourth group that correspond to the second gateway is performed, a fourth group member access request that requests access to the members of the fourth group is sent to the second gateway. In this situation, the fourth group member access request includes information related to the members of the fourth group, for example, a group identifier of the fourth group, or an identifier of a group member of the fourth group.

With regard to access of the network application to the members of the first group, the service function entity sends the first group member access request to the gateway corresponding to the members of the first group, where the first group member access request is used to request access to the members of the first group. That is, for the members of the first group that are connected to the service function entity through the same gateway, the service function entity needs to send only one access request to the gateway, and does not need to send access requests to all of the group members. Therefore, signaling overhead during group communication may be greatly reduced.

According to the group communication method in this embodiment, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

In this embodiment, different access manners may be adopted according to a group member feature or a network feature for the first group member access request sent by the service function entity to the gateway, for example, the Ad-hoc access manner or the sub-group access manner may be adopted. The group member feature may include a device feature and/or an access feature, where the device feature may include a manner for connecting a device and the service function entity and mobility of the device, and the access feature may include, for example, the number of times of access or the access frequency. The network feature may include a network congestion situation. These features or information may be reported by a corresponding device to a platform, a gateway, or another device. For example, during initial access, the device may proactively report the features, or report the features as required by the platform, the gateway, another device, and so on. In addition, the group member feature may also be determined and obtained according to device information collected by the platform, the gateway, or the another device, for example, device information collected in an NRAR (Network Reachability, Addressing and Repository, that is, network reachability, addressing and repository), such as an address for addressing the device or a located gateway address of the device.

Alternatively, the service function entity may send, according to at least one of the following features: the device feature, the network feature and the access feature of the members of the first group, an Ad-hoc access request to the gateway corresponding to the members of the first group, where the Ad-hoc access request includes member identifiers of all of the members of the first group. With regard to the Ad-hoc access manner, the Ad-hoc access request sent by the service function entity to the gateway carries group member information that needs to be processed by the gateway. When the Ad-hoc access manner is adopted, even when a position of a group member under the gateway frequently changes, for example, in case of roaming, the service function entity or the gateway may still perform accurate positioning on the group member.

For example, when the network is congested, the service function entity may automatically use the Ad-hoc access manner to request access to the members of the first group. The service function entity may also determine, that the Ad-hoc access manner is adopted for the access to the members of the first group according to the access feature, for example, the number of times of accessing the members of the first group is small or the frequency of access to the members of the first group is low. Certainly, the service function entity may also determine, according to at least one of the following features: the device feature, the network feature and the access feature of the members of the first group, the adoption of the Ad-hoc access manner.

Alternatively, after the service function entity determines the members of the first group, the service function entity determines, according to the device feature in the group member feature, that the members of the first group have high mobility. Therefore, the service function entity sends the Ad-hoc access request to the gateway corresponding to the members of the first group, where the Ad-hoc access request includes the member identifiers of all of the members of the first group.

It should be understood that the mobility of group members refers to mobility of devices corresponding to the group members. Group members that have high mobility are in a frequent handover state, for example, mobile terminals or vehicle-mounted terminals. These terminals may access different gateways. Group members that have low mobility adopt, for example, plug-and-play devices, and the plug-and-play devices feature a low moving frequency and perform access through a same gateway during a period of time. In a broad sense, the group members that have low mobility also include those group members that have no mobility, for example, wired-access devices or gateways.

Alternatively, the service function entity may create, according to at least one of the following features: the device feature, the network feature and the access feature of the members of the first group, a sub-group with all members of the first group on the gateway corresponding to the members of the first group; or the service function entity determines that the members of the first group belong to an already-created sub-group. In this situation, the service function entity sends a sub-group access request to the gateway, where the sub-group access request includes a sub-group identifier of the sub-group. Compared with the Ad-hoc access manner, the sub-group access manner adopted by the service function entity is simpler and more efficient because only the sub-group identifier needs to be carried.

For example, when the network is congested, the service function entity may automatically use the sub-group access manner to request access to the members of the first group. The service function entity may also determine that the sub-group access manner is adopted for the access to the members of the first group according to the access feature, for example, the number of times of accessing the members of the first group is large or the frequency of access to the members of the first group is high. For example, after the network application creates the group on the service function entity, when the network application accesses the members of the first group in the group, the service function entity may automatically adopt the Ad-hoc access manner according to the group member feature first. However, if the number of times of accessing the members of the first group is large or the frequency of access to the members of the first group is high, to reduce processing overhead and processing delay of the service function entity on each access, in a certain time of processing the access request, the service function entity may create the sub-group using an independent message and adopt the sub-group access manner to access the members of the first group.

Likewise, for example, the service function entity may first automatically create the sub-group on the gateway according to the group member feature and/or network feature of the members of the first group, and adopt the sub-group access manner. However, if the service function entity determines that the number of times of accessing sub-groups is small or the usage frequency of the sub-groups is low, in a certain time of processing the access request, the service function entity carries information of deleting all sub-groups in the request, or deletes all sub-groups using an independent message, and adopts the Ad-hoc access manner to access the members of the first group in subsequent processing. Further, according to that the number of times of accessing some sub-groups is small or the usage frequency of some sub-groups is low, in a certain time of processing the access request, the service function entity may also carry information of deleting these sub-groups in the request, or delete or update these sub-groups using an independent message, and adopt the Ad-hoc access manner in the subsequent processing. Certainly, the service function entity may also determine, according to at least one of the following features: the device feature, the network feature, and the access feature of the first group, the adoption of the sub-group access manner.

Alternatively, after the service function entity determines the members of the first group, the service function entity determines, according to the device feature in the group member feature, that the members of the first group have low mobility. Therefore, the service function entity creates the sub-group with all members of the first group on the gateway corresponding to the members of the first group, and sends the sub-group access request to the gateway, where the sub-group access request includes the sub-group identifier of the sub-group.

Therefore, according to the group communication method in this embodiment, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

The following uses the application of the group communication method according to this embodiment in M2M as an example to describe the group communication method according to this embodiment in detail.

Figure 3:
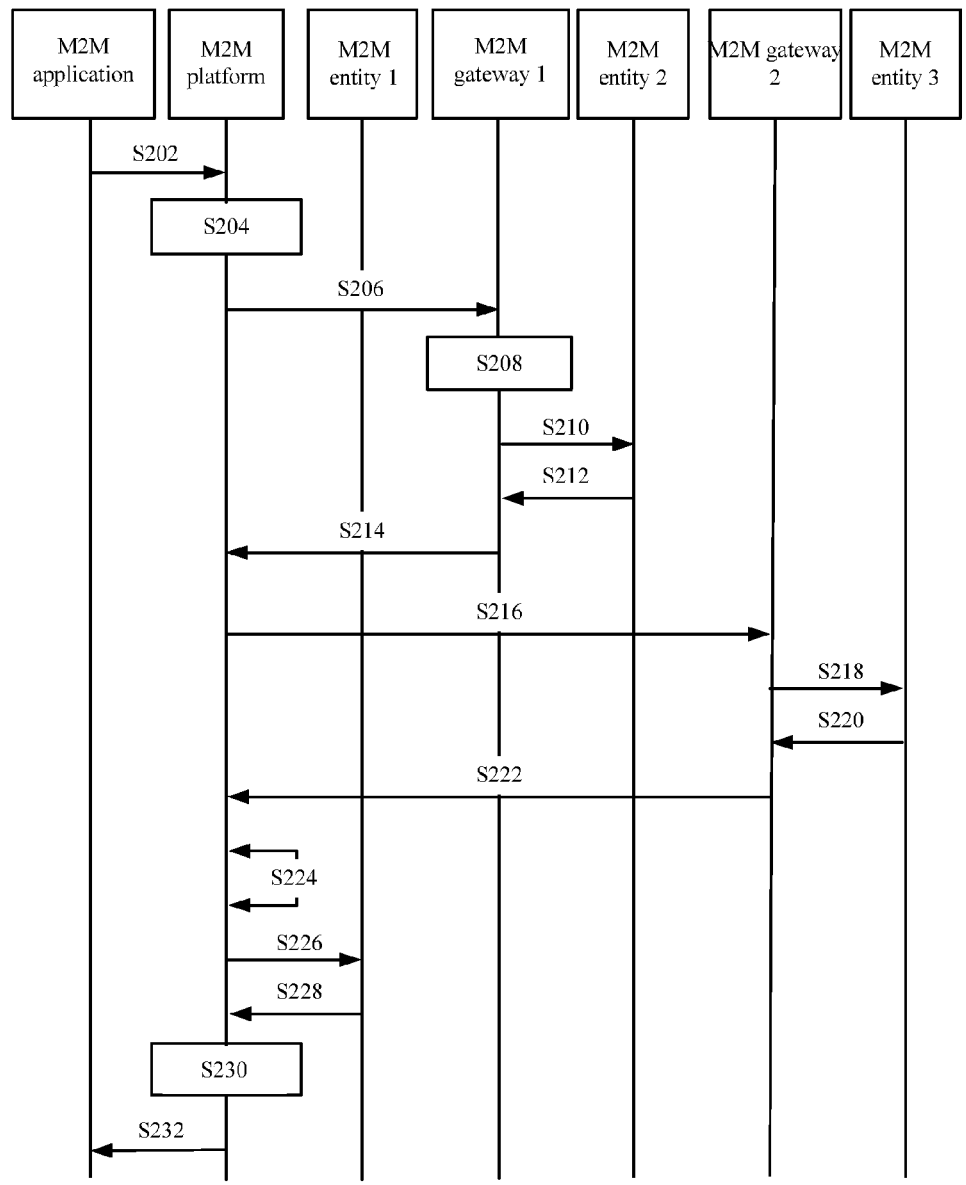
FIG. 3 is a sequence diagram of a group communication method according to another embodiment of the present invention.

FIG. 3 is a sequence diagram of a group communication method 200 according to another embodiment of the present invention. As shown in FIG. 3, in S202, an M2M application sends an M2M group access request to an M2M platform, where the group access request carries a group identifier of a group, and the access request is, for example, a creation request, an update request, a deletion request, an acquisition request, or a subscription request. Alternatively, the group access request may be a READ req (MEMBER CONTENT, NAID, groupResourceID), where the "MEMBER CONTENT" indicates member content, "NAID" indicates a network application identifier, and "groupResourceID" indicates an identifier of a group resource.

In S204, after receiving the group access request, the M2M platform obtains group member information of all group members in the group according to the group identifier, where the group member information includes information such as an identifier and an access manner of a member.

The M2M platform adopts, according to at least one of the following features: a device feature, a network feature, and an access feature of group members, different access manners for access to the group members. Alternatively, for access to members of a first group that are connected to the M2M platform through a same gateway in the group, when the M2M platform determines that the members of the first group have low mobility, the process goes to S206, and when the M2M platform determines that the members of the first group have high mobility, the process goes to S216. For access to members of a second group that are local group members in the group, the process goes to S224, where the local group members refer to local group members of a service function entity to which the group resource belongs. For access to members of a third group that are directly connected to the M2M platform in the group, the process goes to S226.

In S206, the M2M platform creates a sub-group with all members of the first group on an M2M gateway, or the M2M platform determines that the members of the first group belong to an already-created sub-group. In this case, the M2M platform sends a sub-group access request to M2M gateway 1 corresponding to the members of the first group, where the sub-group access request includes a sub-group identifier of the sub-group, and the sub-group access request is used to request access to the sub-group. Alternatively, the sub-group access request may be a READ req (MEMBER CONTENT, NAID, subGroupReourceID), where "subGroupReourceID" indicates an identifier of a sub-group resource.

In S208, after receiving the sub-group access request, M2M gateway 1 obtains sub-group member information of the sub-group according to the sub-group identifier, where the sub-group member information includes an identifier of a sub-group member. Then, M2M gateway 1 sends second access requests to all sub-group members of the sub-group, where the second access request is used to request access to a corresponding sub-group member (as shown in S210), and M2M entity 2 indicates a sub-group member. Alternatively, the second access request may be a READ req (MEMBER CONTENT, Member ID), where "Member ID" indicates an identifier of a member. It should be understood that, in FIG. 3, M2M gateway 1 sends the second access request to M2M entity 2, which is merely for illustration and should not impose any restriction on this embodiment.

In S212, M2M entity 2 sends a third response to M2M gateway 1, where the third response is used to respond to the second access request and the third response indicates a situation of execution of the second access request by a group member in the sub-group. Alternatively, the third response may be a READ reps (data of Member).

In S214, after receiving, from all sub-group members, the third responses respond to the second access request, M2M gateway 1 sends a fourth response to the M2M platform after aggregating access results of all sub-group members, where the fourth response is used to respond to the sub-group access request and the fourth response indicates situations of execution of the access request by all group members in the sub-group. Alternatively, the fourth response may be a READ reps (data of subGroup).

After receiving the access results returned by all sub-group members, M2M gateway 1 may first perform aggregation processing on all access results and then return the processing result after the aggregation to the M2M platform by using one response (that is, the fourth response). In this manner, M2M gateway 1 may be prevented from sending the access results of all sub-group members to the M2M platform. This may further reduce overhead and improve group communication efficiency.

In S216, when the M2M platform determines that the members of the first group have high mobility, the M2M platform decides to adopt the Ad-hoc access manner for the members of the first group. In this case, the M2M platform sends an Ad-hoc access request to M2M gateway 2 corresponding to the members of the first group, where the Ad-hoc access request includes member identifiers of all of the members of the first group. Alternatively, the Ad-hoc access request may be a READ req (MEMBER CONTENT, NAID, Ad-hoc List), where "Ad-hoc List" indicates a list of devices under the same gateway in the group.

In S218, after receiving the Ad-hoc access request, M2M gateway 2 sends a first access request to all of the members of the first group, where the first access request is used to request access to a corresponding member of the first group. Alternatively, the first access request may be a READ req (MEMBER CONTENT, Member ID). In FIG. 3, M2M gateway 2 sending the first access request to M2M entity 3 is taken as an example for description. It should be understood that this is merely for illustration and should not impose any restriction on this embodiment.

In S220, M2M entity 3 sends a first response to M2M gateway 2, where the first response is used to respond to the first access request and the first response indicates a situation of execution of the first access request by a member of the first group. Alternatively, the first response may be a READ reps (data of Member).

In S222, after receiving, from all of the members of the first group, the first responses respond to the first access request, M2M gateway 2 sends a second response to the M2M platform after aggregating access results of all of the members of the first group, where the second response is used to respond to the Ad-hoc access request and the second responses indicates situations of execution of the access request by all of the members of the first group. Alternatively, the second response may be a READ reps (data of Ad-hoc List). Likewise, M2M gateway 2 performs aggregation processing on the access results of all of the members of the first group. This may further reduce overhead and improve group communication efficiency.

It should be understood that, in addition to the Ad-hoc access manner and the sub-group access manner, the M2M platform may also adopt another access manner to access the group members. For example, for access to all of the members of the first group, the M2M platform sends access requests to all of the group members through the M2M gateway. For example, for access to ten members of the first group, the M2M platform needs to send ten access requests to the M2M gateway, where each of the access requests is sent for access to one member of the first group. In this situation, the M2M gateway may receive, from all of the members of the first group, responses respond to the access request, where the response is used to report an access result to the M2M gateway. The M2M gateway may directly forward, to the M2M platform, the responses returned by all of the group members, or may perform aggregation processing on the responses returned by all of the group members and then return a fifth response including a aggregated access result of all of the members of the first group to the M2M platform. It should be understood that the aggregation processing may include performing aggregation processing on the responses returned by all of the group members, and/or performing aggregation processing on the access results included in all responses. Therefore, in this embodiment, the group communication method according to this embodiment may further include: receiving, by the service function entity, the fifth response from the gateway, where the fifth response includes the aggregated access result of all of the members of the first group. This may further reduce overhead and improve group communication efficiency.

After the M2M platform obtains the group member information, for access to the members of the second group that are the local group members, the M2M platform directly performs access processing on the members of the second group, as shown in S224 in FIG. 3, where the local group members refer to the local group members of the home group resource, that is, group members stored on the M2M platform. Alternatively, the access processing may include READ (MEMBER CONTENT, NAID, Local Member List), where "Local Member List" indicates a list of local members.

After the M2M platform obtains the group member information, for access to the members of the third group that are directly connected to the M2M platform in the group, the M2M platform sends third access requests to all of the members of the third group, where the third access request is used to request access to a corresponding member of the third group, as shown in S226 in the figure. Alternatively, the third access request may be a READ req (MEMBER CONTENT, NAID, each Direct-Access Member ID), where "each Direct-Access Member ID" indicates an identifier of each directly-connected member.

In S228, the M2M platform receives, from all of the members of the third group, sixth responses respond to the third access request, where the sixth response indicates a situation of execution of the third access request by a member of the third group. Alternatively, the sixth response may be a READ reps (each data of Direct-Access Member).

In S230, after receiving one or more of the following: the second response, the fourth response, the fifth response, the sixth response, and an execution situation of a local group member, the M2M platform aggregates all of the execution situations and sends a group access response to the M2M application, where the group access response includes the aggregated access result of all of the group members in the group, as shown in S232 in FIG. 3. The M2M platform performs aggregation processing on the access results of all of the group members. This may further reduce overhead and improve group communication efficiency.

The following takes a partial access message of the group as an example to describe the aggregation processing. For example, the service function entity initiates a partial access request, where the request requests access to some subresources or some attributes rather than all subresources or all attributes of the group members. If some group members do not have the requested subresources or attributes, a service capability entity where the resources of these group members are located returns error information. Specifically, if the application scenario is that the service function entity needs to periodically obtain partial resources, the service function entity may create a new group or sub-group as required and delete group members having no subresources or attributes in the original group, or the service function entity may add a group member restriction in the next request message to request access only to those group members having subresources or attributes.

In addition, to reduce overhead of a response from the service capability entity to the service function entity, the service capability entity may first filter the error information out and return only related content to the service function entity; or for the two execution situations that with content and that without content, the service capability entity respectively returns the content and an identifier to the service function entity, where the identifier indicates that group members returning no content do not have related content. In addition, the service capability entity may also aggregate the same execution situations and return an aggregated execution situation to the service function entity, which is capable of further reducing overhead.

Figure 4:
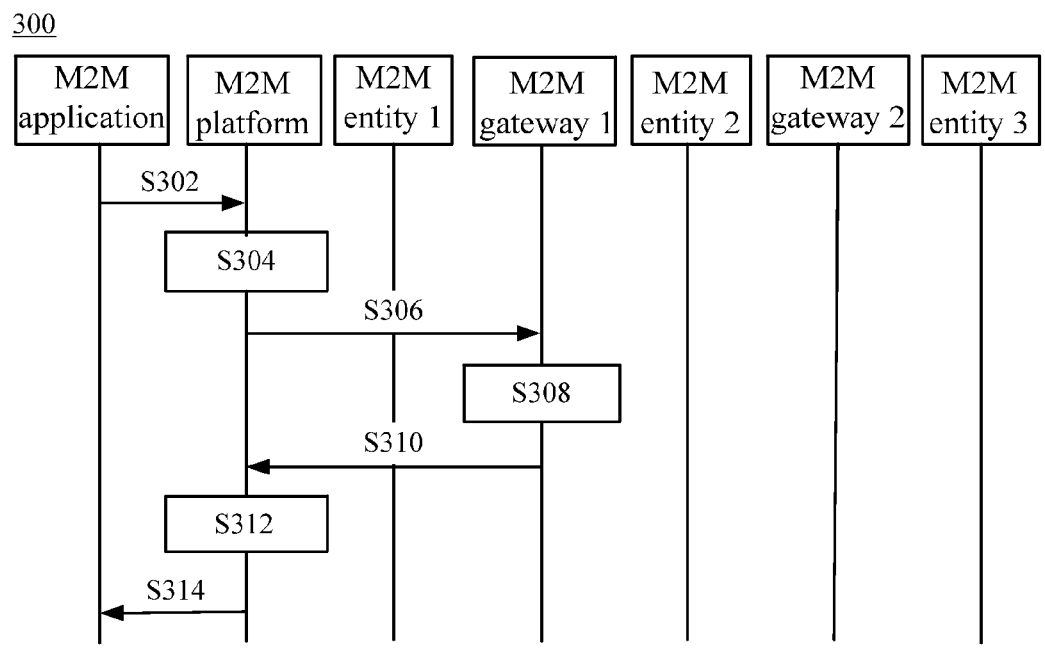
FIG. 4 is a sequence diagram of creating a group and a sub-group in a method according to still another embodiment of the present invention.

FIG. 4 is a sequence diagram of a method 300 for creating a group and a sub-group in a method according to still another embodiment of the present invention. The method for creating a group may include: receiving, from a network application, a group creation request that requests creation of a group, where the group creation request includes group member information of all group members in the group; creating a group resource of the group according to the group creation request, where the group resource includes the group member information and a group identifier of the group; and sending a group creation response to the network application, where the group creation response includes the group identifier.

The following takes an application of the method for creating a group in M2M as an example for description. As shown in FIG. 4, in S302, an M2M application sends an M2M group creation request to an M2M platform, where the group creation request may carry the group member information and may also include parameter information, for example, location for creating the group resource, access right, and expiration time. Alternatively, the group creation request may be a CREATE req (resource, NAID, addressedResourceID, newResourceID, groupContent, searchStrings, AccessRightID, ExpirationTime), where "resource" indicates a resource, "addressedResourceID" indicates an identifier of an addressed resource, "newResourceID" indicates an identifier of a new resource, "groupContent" indicates content of the group, "searchStrings" indicates search strings, "AccessRightID" indicates an identifier of the access right, and "ExpirationTime" indicates the expiration time.

In S304, the M2M platform creates and stores an M2M group resource according to the M2M group creation request, where the group resource includes the group member information and a group identifier of the group, and the group resource may also store access information of a group member, for example, an access manner, used to give instructions on how to access the group member in subsequent operations.

In S314, the M2M platform sends a group creation response to the M2M application, where the group creation response includes the group identifier.

In this embodiment, after creating the group resource of the group, a service function entity may create, according to at least one of the following features: a device feature, a network feature, and an access feature of all group members in the group, a corresponding sub-group on a service capability entity. The process of creating the sub-group may be performed by the service function entity as required by the network application, and the service function entity may also proactively create the sub-group. In addition, the process of creating the sub-group may be performed before the network application sends the access request or after the network application sends the access request.

The method for creating a sub-group may include: sending, by the service function entity, a sub-group creation request that requests creation of a sub-group to a gateway corresponding to members of a first group, where the sub-group creation request includes first group member information of the members of the first group; and after creating a sub-group resource of the sub-group on the gateway, receiving, by the service function entity, a sub-group creation response sent by the gateway, where the sub-group creation response includes a sub-group identifier of the sub-group, and the sub-group resource may include the first group member information and the sub-group identifier of the sub-group.

The following takes an application of the method for creating a sub-group in the M2M as an example for description. As shown in FIG. 4, in S306, the M2M platform sends a sub-group creation request to an M2M gateway, where the sub-group creation request includes the first group member information of the members of the first group, and may also include parameter information in a sub-group definition, for example, location for creating the sub-group, access right, and expiration time. Alternatively, the sub-group creation request may be a CREATE req (resource, NAID, addressedG-SCResourceID, newResourceID, subGroupContent, searchStrings, AccessRightID, ExpirationTime), where "addressedGSCResourceID" indicates an identifier of a resource in a service capability of an addressed gateway, and "subGroupContent" indicates content of the sub-group.

In S308, the M2M gateway creates the sub-group resource of the sub-group on the gateway according to the sub-group creation request, where the sub-group resource includes the sub-group member information and the sub-group identifier of the sub-group. The sub-group may be a device management group, for example, a device management group in a gateway and defined in the OMA DM standard, used to implement a group function of device management. In this embodiment, the M2M platform judges whether the M2M platform is capable of interacting with an OMA server so that the OMA server communicates with the gateway through a DM interface and instructs the gateway to create a group of device management when the sub-group is created or group messages are aggregated.

In S310, the M2M gateway sends a sub-group creation response to the M2M platform, where the sub-group creation response includes the sub-group identifier of the sub-group. Alternatively, the sub-group creation response may be a CREATE resp (resource, subGroupReourceID), where "subGroupReourceID" indicates the sub-group resource.

After receiving the sub-group creation response, the M2M platform may update the group resource, as shown in S312 in FIG. 4. For example, access manners of all group members in the group resource is updated, where the access manner may be direct access manner, Ad-hoc access manner, or sub-group access manner. Access information of all group members may be stored on the M2M platform, where the access information includes the access manner. On the M2M platform, the access information and a group resource definition may have two association modes, for example, internal association and external association, where the internal association refers to that the access information and the group resource definition are in one list, and the group resource definition includes the access information of group members in the group; the external association refers to that the access information forms a list, and the group members may be mapped onto the access information by using a link manner, for example, the link manner based on URI (Uniform Resource Identifier, uniform resource identifier).

According to the group communication method in this embodiment, a sub-group is created for the members of the first group that are connected to the service function entity through the same gateway in the group. Therefore, the service function entity may send only one access request to the gateway, where the access request includes the sub-group identifier. In this manner, the method according to this embodiment may prevent the service function entity from sending access requests to all of the group members, thereby significantly reducing signaling overhead during group communication and improving group communication efficiency.

Figure 5:
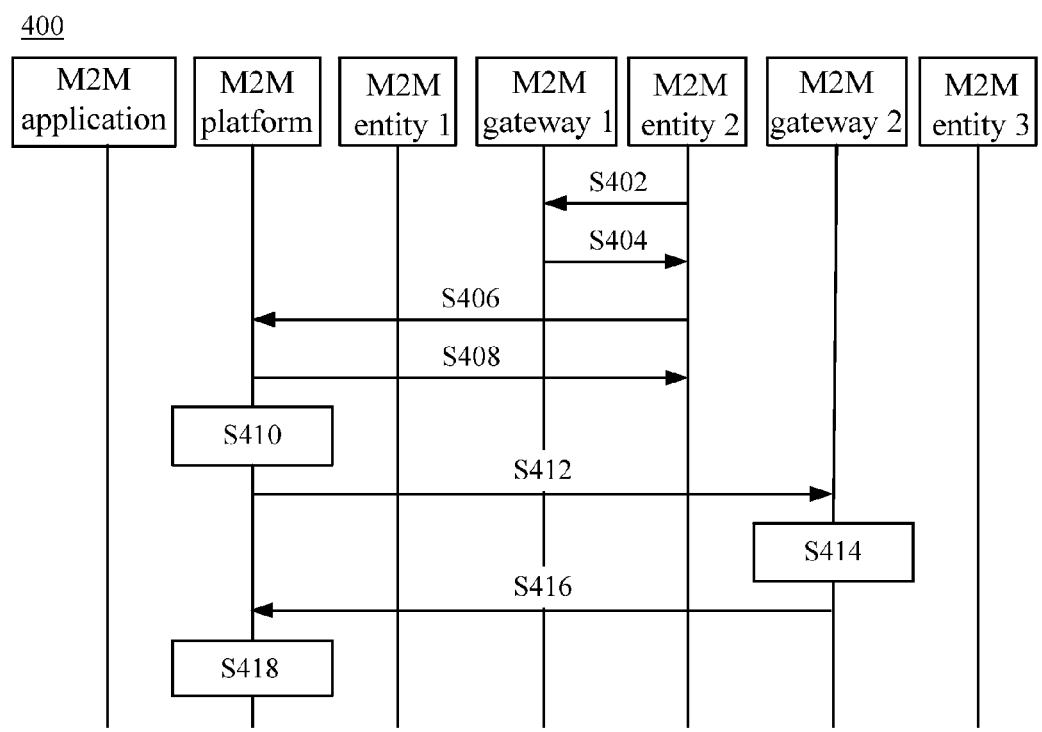
FIG. 5 is a sequence diagram of updating a group and a sub-group in a method according to still another embodiment of the present invention.

FIG. 5 is a sequence diagram of a method 400 for updating a group and a sub-group in a method according to still another embodiment of the present invention. In FIG. 5, M2M entity 2 connected to an M2M platform through M2M gateway 1 is taken as an example for description.

In S402, M2M entity 2 sends a connection request to M2M gateway 1; in S404, M2M gateway 1 returns a response to the connection request to M2M entity 2; in S406, M2M entity 2 sends a registration request to the M2M platform, where the registration request is used to register device information of M2M entity 2 with the platform, and the device information may include, for example, an identifier of a device, an identifier of a home gateway, a routing address, and a physical address; in S408, the M2M platform returns a response to the registration request to M2M entity 2, where the response is used to indicate a registration situation of M2M entity 2.

In S410, the M2M platform checks, according to the device information and an existing group definition or group rule, whether a new device needs to be added to an existing group. If the newly added device belongs to the existing group, the M2M platform may further create a new group or sub-group according to rules for creating a group and a sub-group. For example, as shown in S412, the M2M platform sends a request for updating a sub-group resource to M2M gateway 2. In S414, M2M gateway 2 updates the sub-group resource on the gateway; in S416, M2M gateway 2 sends a response to the request for updating the sub-group resource to the M2M platform; and in S418, the M2M platform updates access manners of all group members in the group.

In this embodiment, the updating the sub-group resource further includes: when the number of members of a first group changes, for example, the number of members of the first group increases or decreases, sending, by a service function entity, an update request for updating the sub-group resource to the gateway; and when the number of members of the first group is not greater than 1, sending, by the service function entity, a deletion request for deleting the sub-group resource to the gateway. In this embodiment, after the gateway creates, updates or deletes the sub-group, the service function entity updates a type of access to the corresponding group member information in a group resource.

According to the group communication method in this embodiment, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

Figure 6:
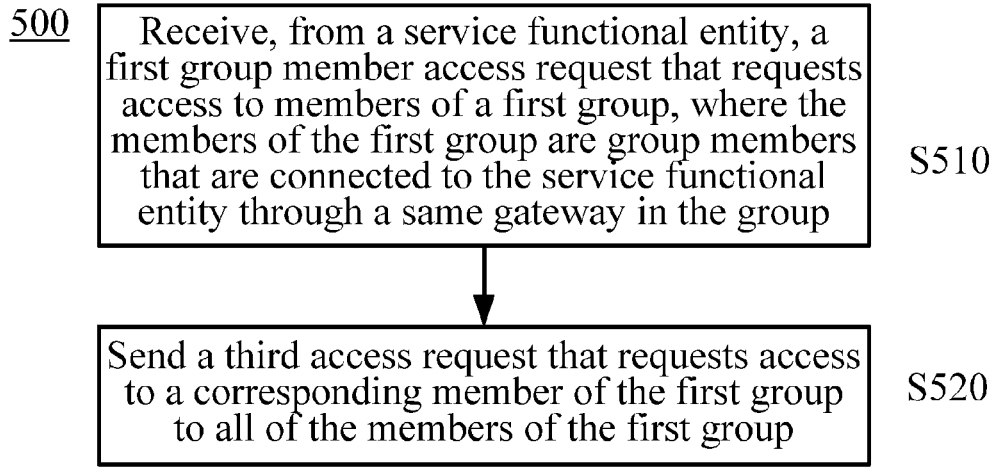
FIG. 6 is a flow chart of a group communication method according to still another embodiment of the present invention.

FIG. 6 is a flow chart of a group communication method 500 according to still another embodiment of the present invention. As shown in FIG. 6, the method 500 includes:

In S510, a gateway receives, from a service function entity, a first group member access request that requests access to members of a first group, where the members of the first group are group members that are connected to the service function entity through a same gateway in the group.

The service function entity may determine, according to at least one of the following features: a group member feature and a network feature of the members of the first group, whether the Ad-hoc access manner or the sub-group access manner is adopted for the first group member access request.

When the service function entity adopts the Ad-hoc access manner to request access to the members of the first group, the gateway receives, from the service function entity, an Ad-hoc access request that requests access to the members of the first group, where the Ad-hoc access request includes member identifiers of all of the members of the first group.

When the service function entity adopts the sub-group access manner to request access to the members of the first group, the gateway receives, from the service function entity, a sub-group access request that requests access to the members of the first group, where the sub-group access request includes a sub-group identifier of the sub-group, and the service function entity sends the sub-group access request after determining that the members of the first group belong to an already-created sub-group corresponding to the gateway.

Alternatively, the gateway receives, from the service function entity, a sub-group access request that requests access to the members of the first group, where the sub-group access request includes a sub-group identifier of the sub-group, and the service function entity sends the sub-group access request after requesting creation of a sub-group on the gateway and determining that the members of the first group belong to the sub-group created by the gateway.

In S520, the gateway sends a third access request that requests access to all members of the first group respectively to all of the members of the first group.

When the service function entity adopts the Ad-hoc access manner to request access to the members of the first group, the gateway sends a first access request that requests access to all members of the first group respectively to all of the members of the first group, where the gateway sends the first access request after receiving the Ad-hoc access request.

When the service function entity adopts the sub-group access manner to request access to the members of the first group, the gateway obtains sub-group member information of the sub-group according to the sub-group access request; and the gateway sends a second access request that requests access to all sub-group members respectively to all sub-group members of the sub-group.

According to the group communication method in this embodiment, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

In this embodiment, the group communication method 500 according to this embodiment may further include: after the gateway sends the first access request, sending, by the gateway, a second response to the service function entity, where the second response includes a aggregated access result of all of the members of the first group, and the gateway sends the second response after receiving, from all of the members of the first group, first responses respond to the first access request.

In this embodiment, the group communication method 500 according to this embodiment may further include: after the gateway sends the second access request, sending, by the gateway, a fourth response to the service function entity, where the fourth response includes a aggregated access result of all sub-group members of the sub-group, and the gateway sends the fourth response after receiving, from all sub-group members, third responses respond to the second access request.

In this embodiment, the method 500 may further include: sending, by the gateway, a fifth response to the service function entity, where the fifth response includes an aggregated access result of all of the members of the first group.

In this embodiment, the method 500 may further include: receiving, by the gateway, an update request from the service function entity, where the update request is used to request updating of a sub-group resource of the sub-group; and updating, by the gateway, the sub-group resource according to the update request.

According to the group communication method in this embodiment, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

Figure 7:
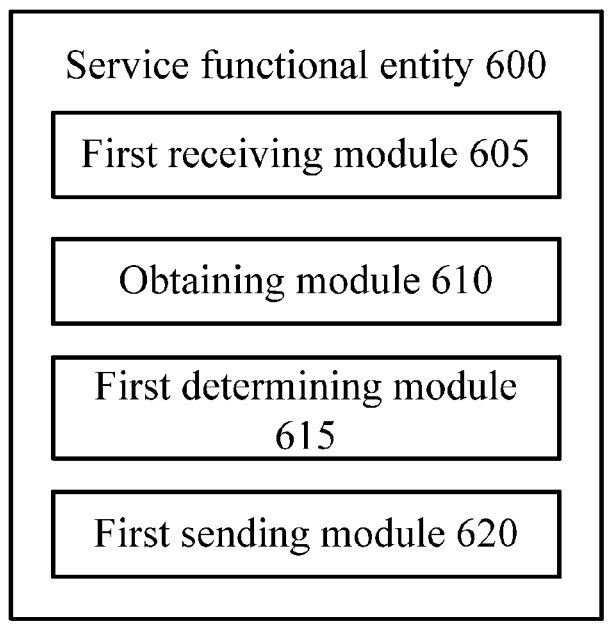
FIG. 7 is a schematic diagram of a service function entity for group communication according to an embodiment of the present invention.

The following describes a service function entity for group communication according to an embodiment of the present invention. As shown in FIG. 7, a schematic diagram of a service function entity 600 for group communication according to an embodiment of the present invention is illustrated. The service function entity 600 includes: a first receiving module 605, an obtaining module 610, a first determining module 615, and a first sending module 620, where:

the first receiving module 605 is configured to receive, from a network application, a group access request that requests access to a group, where the group access request includes a group identifier of the group;

the obtaining module 610 is configured to obtain group member information of all group members in the group according to the group identifier;

the first determining module 615 is configured to, according to the group member information, determine members of a first group that are connected to the service function entity through a same gateway in the group; and the first sending module 620 is configured to send, to the gateway, a first group member access request that requests access to the members of the first group.

According to the service function entity for group communication in this embodiment, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

Figure 8:
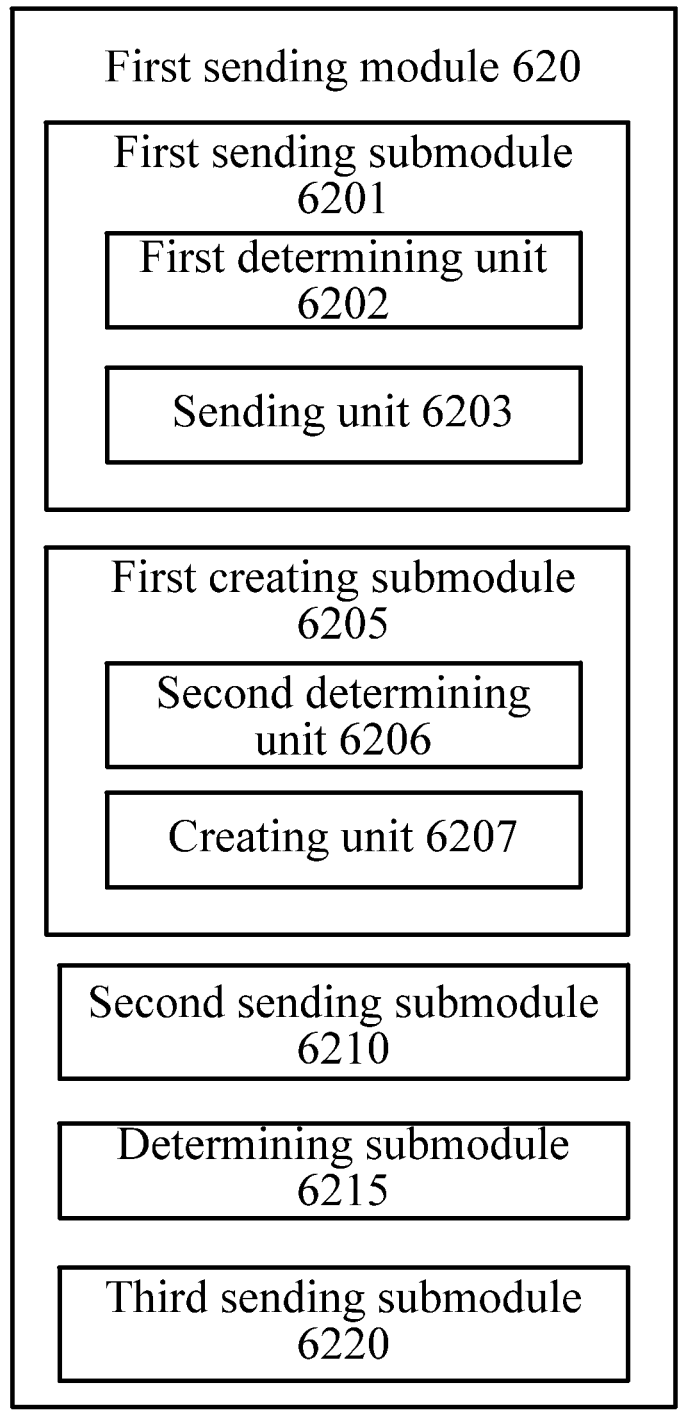
FIG. 8 is a schematic diagram of a first sending module of a service function entity according to another embodiment of the present invention.

Alternatively, as shown in FIG. 8, the first sending module 620 in the service function entity 600 according to this embodiment may further include a first sending submodule 6201, where:

the first sending submodule 6201 is configured to, according to at least one of the following features: a group member feature and a network feature of the members of the first group, send an Ad-hoc access request to the gateway, where the Ad-hoc access request includes member identifiers of all of the members of the first group, and the group member feature may include a device feature and an access feature.

Alternatively, the first sending submodule 6201 includes a first determining unit 6202 and a sending unit 6203, where:

the first determining unit 6202 is configured to, according to the group member feature of the members of the first group, determine that the members of the first group have high mobility; and the sending unit 6203 is configured to send the Ad-hoc access request to the gateway, where the Ad-hoc access request includes the member identifiers of all of the members of the first group.

Alternatively, the first sending module 620 according to this embodiment may further include a first creating submodule 6205 and a second sending submodule 6210, where:

the first creating submodule 6205 is configured to create a sub-group with all members of the first group on the gateway according to at least one of the following features: the group member feature and the network feature of the members of the first group; and the second sending submodule 6210 is configured to send a sub-group access request to the gateway, where the sub-group access request includes a sub-group identifier of the sub-group.

Alternatively, the first creating submodule 6205 includes:

a second determining unit 6206, configured to determine that the members of the first group have low mobility according to the group member feature of the members of the first group; and a creating unit 6207, configured to create the sub-group with all members of the first group on the gateway.

Alternatively, the first sending module 620 according to this embodiment may further include:

a determining submodule 6215, configured to determine that the members of the first group belong to an already-created sub-group corresponding to the gateway; and a third sending submodule 6220, configured to send a sub-group access request to the gateway, where the sub-group access request includes a sub-group identifier of the sub-group.

Figure 9A:
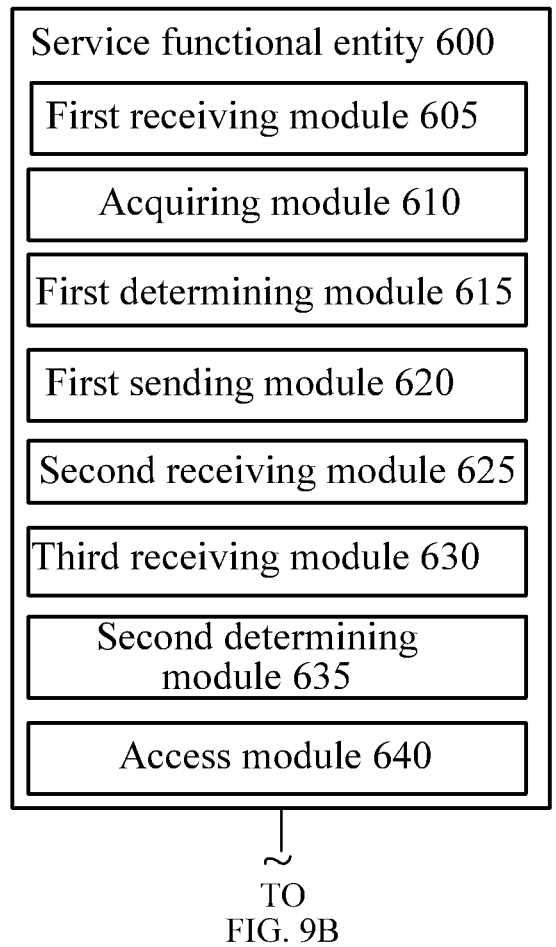
FIG. 9A and FIG. 9B are schematic diagrams of a service function entity for group communication according to still another embodiment of the present invention.
Figure 9B:
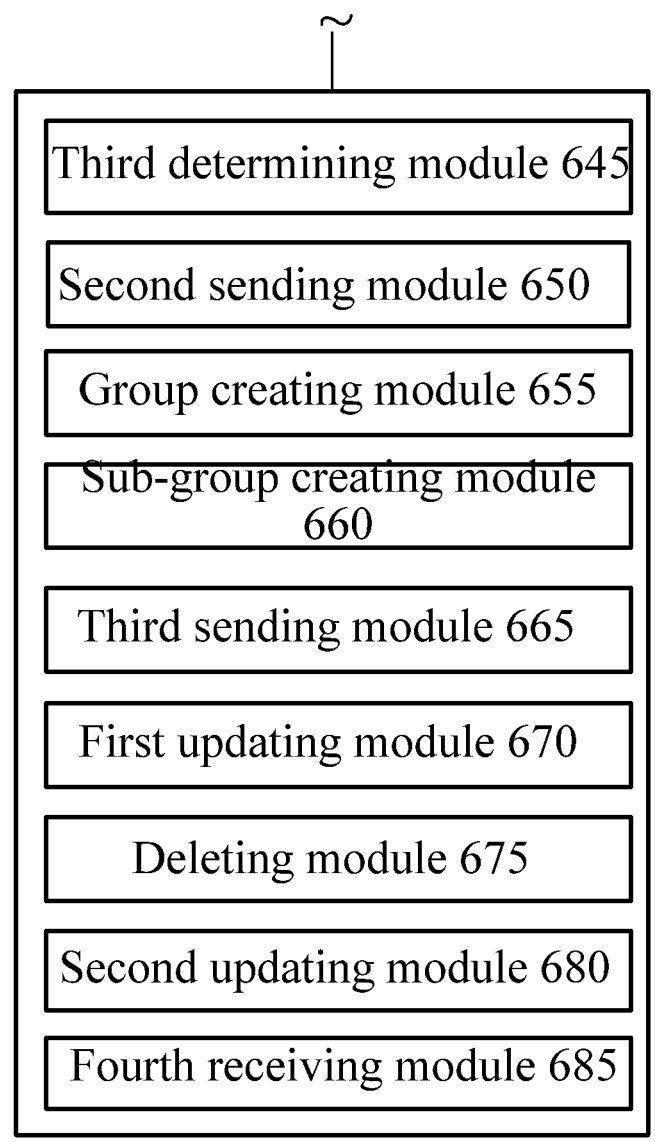

FIG. 9A and FIG. 9B are schematic diagrams of a service function entity 600 for group communication according to still another embodiment of the present invention. The service function entity 600 may further include:

a second receiving module 625, configured to receive a second response from the gateway, where the second response includes an aggregated access result of all of the members of the first group.

Alternatively, the service function entity 600 may further include:

a third receiving module 630, configured to receive a fourth response from the gateway, where the fourth response includes an aggregated access result of all sub-group member of the sub-group.

Alternatively, the service function entity 600 may further include:

a second determining module 635, configured to determine, according to the group member information, members of a second group that are local group members in the group; and an access module 640, configured to perform access processing on the members of the second group.

Alternatively, the service function entity 600 may further include:

a third determining module 645, configured to determine, according to the group member information, members of a third group that are directly connected to the service function entity in the group; and a second sending module 650, configured to send a third access request that requests access to all members of the third group respectively to all of the members of the third group.

Figure 10:
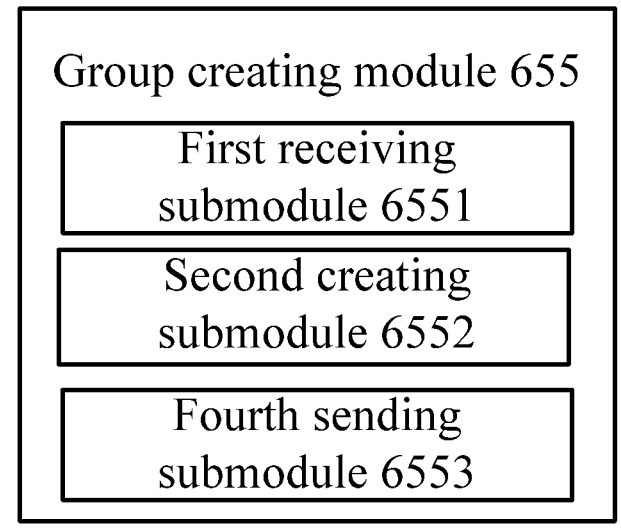
FIG. 10 is a schematic diagram of a group creating module of a service function entity according to still another embodiment of the present invention.

Alternatively, the service function entity 600 may further include a group creating module 655. Alternatively, as shown in FIG. 10, the group creating module 655 includes:

a first receiving submodule 6551, configured to receive, from the network application, a group creation request that requests creation of a group, where the group creation request includes group member information of all group member in the group;

a second creating submodule 6552, configured to create a group resource of the group according to the group creation request, where the group resource includes the group member information and a group identifier of the group; and a fourth sending submodule 6553, configured to send a group creation response to the network application, where the group creation response includes the group identifier.

Figure 11:
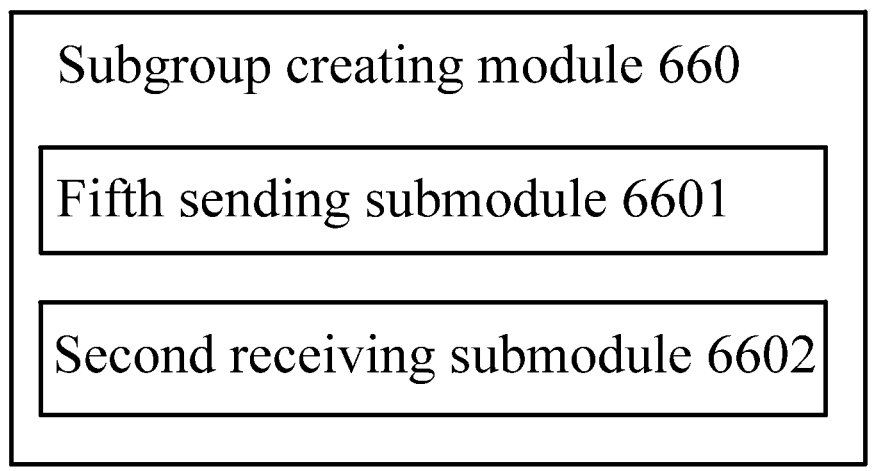
FIG. 11 is a schematic diagram of a sub-group creating module of a service function entity according to still another embodiment of the present invention.

Alternatively, the service function entity 600 may further include a sub-group creating module 660. Alternatively, as shown in FIG. 11, the sub-group creating module 660 includes:

a fifth sending submodule 6601, configured to, according to at least one of the following features: a group member feature and a network feature of all group member in the group, send a sub-group creation request that requests creation of a sub-group to the gateway, where the sub-group creation request includes first group member information of the members of the first group; and a second receiving submodule 6602, configured to receive a sub-group creation response sent by the gateway, where the sub-group creation response includes a sub-group identifier of the sub-group, and the gateway sends the sub-group creation response after creating a sub-group resource of the sub-group.

Alternatively, the service function entity 600 may further include:

a third sending module 665, configured to send a group access response to the network application, where the group access response includes a aggregated access result of all group members in the group.

Alternatively, the service function entity 600 may further include:

a first updating module 670, configured to send, when the members of the first group change, an update request for updating the sub-group resource to the gateway.

Alternatively, the service function entity 600 may further include:

a deleting module 675, configured to, when the number of members of the first group is not greater than 1, send a deletion request for deleting the sub-group resource to the gateway.

Alternatively, the service function entity 600 may further include:

a second updating module 680, configured to, after the gateway creates, updates or deletes the sub-group, update a manner of access to the group member information in the group resource.

Alternatively, the service function entity 600 may further include:

a fourth receiving module 685, configured to receive a fifth response from the gateway, where the fifth response includes an aggregated access result of all of the members of the first group.

The foregoing and other operations and/or functions of each of the modules in the service function entity 600 are provided for implementing the corresponding process in each of the methods 100, 200, 300, 400, and 500 in FIG. 2 to FIG. 6, which, for brevity, is not described here.

According to the service function entity for group communication in this embodiment, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

Figure 12:
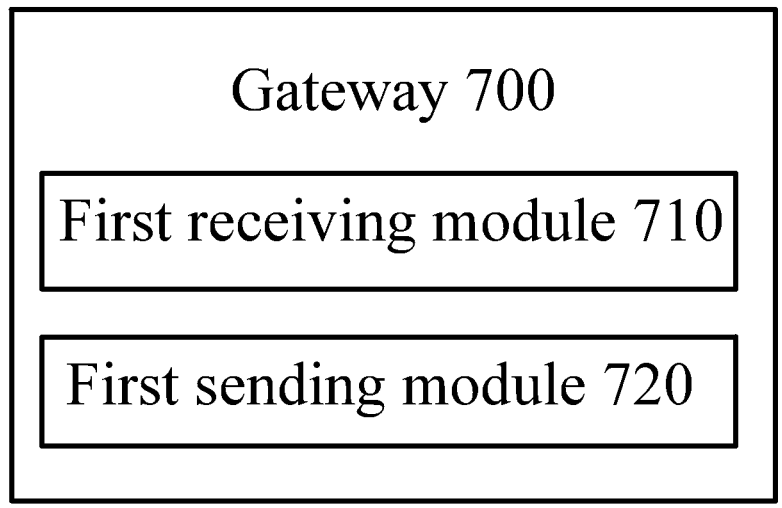
FIG. 12 is a schematic diagram of a gateway for group communication according to an embodiment of the present invention.

FIG. 12 is a schematic diagram of a gateway 700 for group communication according to an embodiment of the present invention. The gateway 700 includes a first receiving module 710 and a first sending module 720, where:

the first receiving module 710 is configured to receive, from a service function entity, a first group member access request that requests access to members of a first group, where the members of the first group are group members that are connected to the service function entity through a same gateway in a group; and the first sending module 720 is configured to send a third access request that requests access to all members of the first group respectively to all of the members of the first group.

Figure 13:
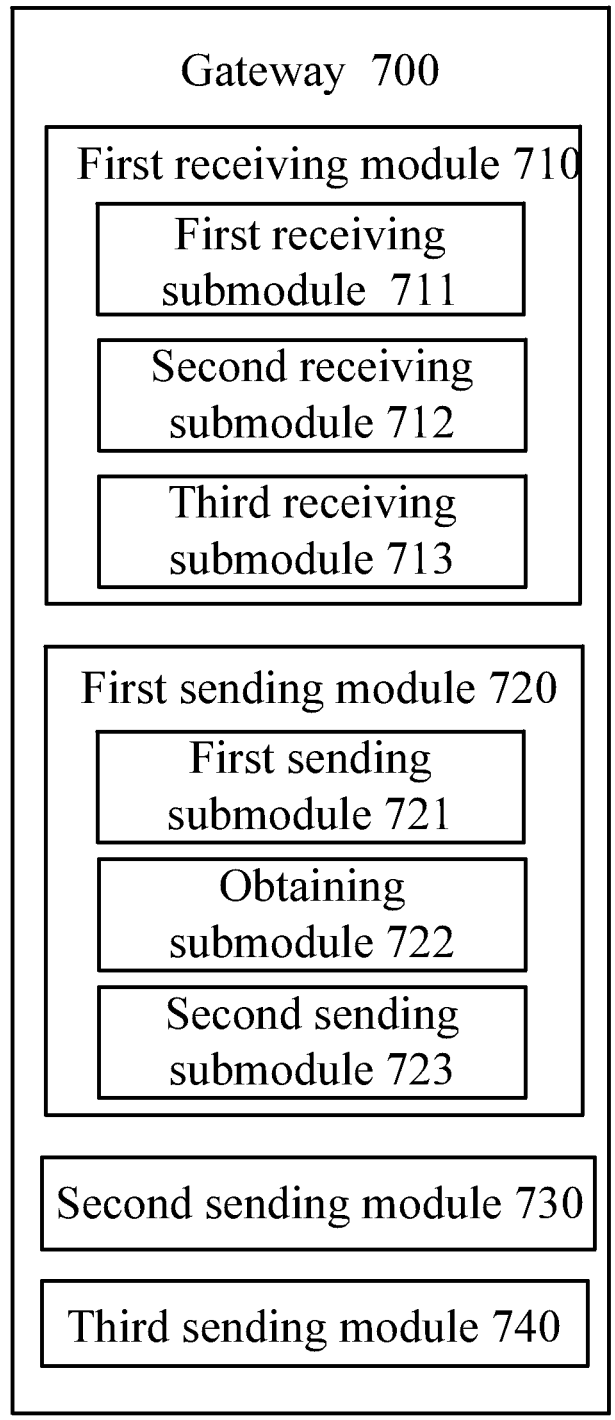
FIG. 13 is a schematic diagram of a gateway for group communication according to another embodiment of the present invention.

Alternatively, as shown in FIG. 13, the first receiving module 710 in the gateway 700 according to this embodiment includes:

a first receiving submodule 711, configured to receive, from the service function entity, an Ad-hoc request that requests access to the members of the first group, where the Ad-hoc request includes member identifiers of all of the members of the first group.

The first sending module 720 includes:

a first sending submodule 721, configured to send a first access request that requests access to all members of the first group respectively to all of the members of the first group.

Alternatively, the first receiving module 710 is further configured to receive, from all of the members of the first group, first response respond to the first access request, where the first response includes an access result of a corresponding group member; and the gateway 700 further includes:

a second sending module 730, configured to send a second response to the service function entity, where the second response includes an aggregated access result of all of the members of the first group.

Alternatively, the first receiving module 710 includes:

a second receiving submodule 712, configured to receive, from the service function entity, a sub-group access request that requests access to the members of the first group, where the sub-group access request includes a sub-group identifier of the sub-group, and the service function entity sends the sub-group access request after determining that the members of the first group belong to an already-created sub-group corresponding to the gateway.

Alternatively, the first receiving module 710 includes:

a third receiving submodule 713, configured to receive, from the service function entity, a sub-group access request that requests access to the members of the first group, where the sub-group access request includes a sub-group identifier of the sub-group, and the sub-group access request is sent by the service function entity after the service function entity requests creation of a sub-group on the gateway and determines that the members of the first group belong to the sub-group created by the gateway.

Alternatively, the first sending module 720 includes:

an obtaining submodule 722, configured to obtain sub-group member information of the sub-group according to the sub-group access request; and a second sending submodule 723, configured to send, according to the sub-group member information, a second access request that requests access to all sub-group members respectively to all sub-group members of the sub-group.

Alternatively, the first receiving module 710 is further configured to receive, from all of the members of the first group, first responses respond to the first access request, where the first response includes an access result of a corresponding group member; and the gateway 700 further includes:

a third sending module 740, configured to send a fourth response to the service function entity, where the fourth response includes an aggregated access result of all sub-group member of the sub-group.

The foregoing and other operations and/or functions of each of the modules in the gateway 700 are provided for implementing the corresponding process in each of the methods 100, 200, 300, 400, and 500 in FIG. 2 to FIG. 6, which, for brevity, is not described here.

According to the gateway for group communication in this embodiment, the service function entity determines the members of the first group that are connected to the service function entity through the same gateway in the group and sends one access request to the gateway. This may prevent the service function entity from sending access requests to all of the group members, thereby significantly reducing signaling overhead during group communication and improving group communication efficiency.

An embodiment of the present invention further provides a system for group communication. The system includes the service function entity 600 according to the embodiment of the present invention and the gateway 700 according to the embodiment of the present invention. The foregoing and other operations and/or functions of each of the modules in the service function entity 600 and the gateway 700 are provided for implementing the corresponding process in each of the methods 100, 200, 300, 400, and 500 in FIG. 2 to FIG. 6, which, for brevity, is not described here.

A person skilled in the art may appreciate that each of the steps in the methods and the units described in the embodiments disclosed herein may be implemented using electronic hardware, computer software, or a combination thereof To clearly describe the interchangeability between the hardware and the software, the foregoing generally describes compositions and steps of each embodiment according to the functions. Whether these functions are performed using hardware or software depends on particular applications and design constraints of the technical solutions. A person skilled in the art may use different methods to implement the described functions for each particular application, but it should not be considered that such implementation goes beyond the scope of the present invention.

The methods or steps described in combination with the embodiments disclosed herein may be implemented using hardware, a software program executed by a processor, or a combination thereof. The software program may be placed in a random access memory (RAM), a memory, a read-only memory (ROM), an electrically programmable ROM, an electrically erasable programmable ROM, a register, a hard disk, a removable magnetic disk, a CD-ROM, or a storage medium of any other form well-known in the technical field.

The present invention is described in detail with reference to the accompany drawings in combination with the exemplary embodiments, but it is not limited to the foregoing. Various equivalent modifications or replacements made by a person skilled in the art without departing from the spirit and essence of the present invention shall fall within the scope of the present invention.

We claim:

1. A group communication method, comprising:
receiving, from a network application, a group access request that requests access to a group, wherein the group access request comprises a group identifier of the group;
obtaining group member information of all group members in the group according to the group identifier;
determining, according to the group member information, members of a first group that are connected to a service function entity through a same gateway in the group; and
sending, to the gateway, a first group member access request that requests access to the members of the first group.

2. The method according to claim 1, wherein the sending, to the gateway, a first group member access request that requests access to the members of the first group comprises:
sending an Ad-hoc access request to the gateway according to at least one of the following features: a group member feature and a network feature of the members of the first group, wherein the Ad-hoc access request comprises member identifiers of all of the members of the first group.

3. The method according to claim 2, wherein the sending an Ad-hoc access request to the gateway according to at least one of the following features: a group member feature and a network feature of the members of the first group comprises:
determining that the members of the first group have high mobility according to the group member feature of the members of the first group; and
sending the Ad-hoc access request to the gateway, wherein the Ad-hoc access request comprises the member identifiers of all of the members of the first group.

4. The method according to claim 2, wherein after the sending an Ad-hoc access request to the gateway, the method further comprises:
receiving a second response from the gateway, wherein the second response comprises a aggregated access result of all of the members of the first group, and the second response is sent by the gateway after the gateway sends, according to the Ad-hoc access request, first access requests that request access to all members of the first group respectively to all the members of the first group and receiving, from all of the members of the first group, first responses respond to the first access request.

5. The method according to claim 1, wherein the sending, to the gateway, a first group member access request that requests access to the members of the first group comprises:
creating, according to at least one of the following features: a group member feature and a network feature of the members of the first group, a sub-group comprising all members of the first group on the gateway; and
sending a sub-group access request to the gateway, wherein the sub-group access request comprises a sub-group identifier of the sub-group.

6. The method according to claim 5, wherein the creating, according to at least one of the following features: a group member feature and a network feature of the members of the first group, a sub-group comprising all members of the first group on the gateway comprises:
determining that the members of the first group have low mobility according to the group member feature of the members of the first group; and
creating, on the gateway, the sub-group comprising all the members of the first group.

7. The method according to claim 5, wherein after the sending a sub-group access request to the gateway, the method further comprises:
receiving a fourth response from the gateway, wherein the fourth response comprises a aggregated access result of all sub-group members of the sub-group, and the fourth response is sent by the gateway after the gateway obtains sub-group member information of the sub-group according to the sub-group access request, sends a second access request that requests access to a corresponding sub-group members respectively to all sub-group members of the sub-group, and receives, from all sub-group member, third responses respond to the second access request.

8. The method according to claim 1, wherein before the receiving, from a network application, a group access request that requests access to a group, the method further comprises:
receiving, from the network application, a group creation request that requests creation of a group, wherein the group creation request comprises group member information of all group members in the group;
creating a group resource of the group according to the group creation request, wherein the group resource comprises the group member information and a group identifier of the group; and
sending a group creation response to the network application, wherein the group creation response comprises the group identifier.

9. The method according to claim 8, wherein after the creating a group resource of the group, the method further comprises:
sending, according to at least one of the following features: a group member feature and a network feature of all group members in the group, a sub-group creation request that requests creation of a sub-group to the gateway, wherein the sub-group creation request comprises first group member information of the members of the first group; and
receiving a sub-group creation response sent by the gateway, wherein the sub-group creation response comprises a sub-group identifier of the sub-group, and the sub-group creation response is sent by the gateway after the gateway creates a sub-group resource of the sub-group.

10. The method according to claim 1, further comprising:
receiving a fifth response from the gateway, wherein the fifth response comprises an aggregated access result of all of the members of the first group.

11. The method according to claim 1, further comprising:
sending a group access response to the network application, wherein the group access response comprises an aggregated access result of all group members in the group.

12. A service function entity for group communication, comprising:
a first receiving module, configured to receive, from a network application, a group access request that requests access to a group, wherein the group access request comprises a group identifier of the group;
an obtaining module, configured to obtain group member information of all group members in the group according to the group identifier;
a first determining module, configured to, according to the group member information, determine members of a first group that are connected to the service function entity through a same gateway in the group; and
a first sending module, configured to send, to the gateway, a first group member access request that requests access to the members of the first group.

13. The service function entity according to claim 12, wherein the first sending module comprises:
a first sending submodule, configured to send an Ad-hoc access request to the gateway according to at least one of the following features: a group member feature and a network feature of the members of the first group, wherein the Ad-hoc access request comprises member identifiers of all of the members of the first group.

14. The service function entity according to claim 13, wherein the first sending submodule comprises:
a determining unit, configured to, according to the group member feature of the members of the first group, determine that the members of the first group have high mobility; and
a sending unit, configured to send the Ad-hoc access request to the gateway, wherein the Ad-hoc access request comprises the member identifiers of all of the members of the first group.

15. The service function entity according to claim 13, further comprising:
a second receiving module, configured to receive a second response from the gateway, wherein the second response comprises an aggregated access result of all of the members of the first group.

16. The service function entity according to claim 12, wherein the first sending module comprises:
a first creating submodule, configured to create a sub-group comprising all members of the first group on the gateway according to at least one of the following features: a group member feature and a network feature of the members of the first group; and
a second sending submodule, configured to send a sub-group access request to the gateway, wherein the sub-group access request comprises a sub-group identifier of the sub-group.

17. The service function entity according to claim 16, wherein the first creating submodule comprises:

a second determining unit, configured to determine that the members of the first group have low mobility according to the group member feature of the members of the first group; and a creating unit, configured to create the sub-group comprising all members of the first group on the gateway.

18. The service function entity according to claim 16, further comprising:
a third receiving module, configured to receive a fourth response from the gateway, wherein the fourth response comprises an aggregated access result of all sub-group members of the sub-group.

19. The service function entity according to claim 12, further comprising a group creating module, wherein the group creating module comprises:
a first receiving submodule, configured to receive, from the network application, a group creation request that requests creation of a group, wherein the group creation request comprises group member information of all group members in the group;
a second creating submodule, configured to create a group resource of the group according to the group creation request, wherein the group resource comprises the group member information and a group identifier of the group; and
a fourth sending submodule, configured to send a group creation response to the network application, wherein the group creation response comprises the group identifier.

20. The service function entity according to claim 19, further comprising a sub-group creating module, wherein the sub-group creating module comprises:
a fifth sending submodule, configured to, according to at least one of the following features: a group member feature and a network feature of all group members in the group, send a sub-group creation request that requests creation of a sub-group to the gateway, wherein the sub-group creation request comprises first group member information of the members of the first group; and
a second receiving submodule, configured to receive a sub-group creation response sent by the gateway, wherein the sub-group creation response comprises a sub-group identifier of the sub-group, and the gateway sends the sub-group creation response after creating a sub-group resource of the sub-group.

21. The service function entity according to claim 12, further comprising:
a fourth receiving module, configured to receive a fifth response from the gateway, wherein the fifth response comprises an aggregated access result of all of the members of the first group.

22. The service function entity according to claim 12, further comprising:
a third sending module, configured to send a group access response to the network application, wherein the group access response comprises an aggregated access result of all group members in the group.

23. A gateway for group communication, comprising:
a first receiving module, configured to receive, from a service function entity, a first group member access request that requests access to members of a first group, wherein the members of the first group are group members that are connected to the service function entity through a same gateway in a group; and a first sending module, configured to send a third access request that requests access to all members of the first group respectively to all of the members of the first group;
wherein the first receiving module comprises:
a first receiving submodule, configured to receive, from the service function entity, an Ad-hoc request that requests access to the members of the first group, wherein the Ad-hoc request comprises a member identifier of all of the members of the first group; and
the first sending module comprises:
a first sending submodule, configured to send a first access request that requests access to all members of the first group respectively to all of the members of the first group.

24. The gateway according to claim 23, wherein the first receiving module is further configured to receive, from all of the members of the first group, first responses respond to the first access request, wherein the first response comprises an access result of a corresponding group member; and
the gateway further comprises:
a second sending module, configured to send a second response to the service function entity, wherein the second response comprises an aggregated access result of all of the members of the first group.

25. The gateway according to claim 23, wherein the first receiving module comprises:
a second receiving submodule, configured to receive, from the service function entity, a sub-group access request that requests access to the members of the first group, wherein the sub-group access request comprises a sub-group identifier of the sub-group, and the service function entity sends the sub-group access request after determining that the members of the first group belong to an already-created sub-group corresponding to the gateway.

26. The gateway according to claim 25, wherein the first sending module comprises:
an obtaining submodule, configured to obtain sub-group member information of the sub-group according to the sub-group access request; and
a second sending submodule, configured to send, according to the sub-group member information, a second access request that requests access to all sub-group members respectively to all sub-group members of the sub-group.

27. The gateway according to claim 26, wherein the first receiving module is further configured to receive, from all of the members of the first group, first responses respond to the first access request, wherein the first response comprises an access result of a corresponding group member; and
the gateway further comprises:
a third sending module, configured to send a fourth response to the service function entity, wherein the fourth response comprises an aggregated access result of all sub-group members of the sub-group.

28. The gateway according to claim 23, wherein the first receiving module comprises:
a third receiving submodule, configured to receive, from the service function entity, a sub-group access request that requests access to the members of the first group, wherein the sub-group access request comprises a sub-group identifier of the sub-group, and the sub-group access request is sent by the service function entity after the service function entity requests creation of a subgroup on the gateway and determines that the members of the first group belong to the sub-group created by the gateway.

29. A computer program product comprising computer executable instructions stored on a non-transitory computer readable medium such that when executed by a computer program processor that cause a group communication to:
   receive, from a network application, a group access request that requests access to a group, wherein the group access request comprises a group identifier of the group;
   obtain group member information of all group members in the group according to the group identifier;
   determine, according to the group member information, members of a first group that are connected to a service function entity through a same gateway in the group; and
   send, to the gateway, a first group member access request that requests access to the members of the first group.

30. The computer program product of claim 29, wherein the computer executable instructions that send, to the gateway, a first group member access request that requests access to the members of the first group further comprises computer executable instructions that:
   send an Ad-hoc access request to the gateway according to at least one of the following features: a group member feature and a network feature of the members of the first group, wherein the Ad-hoc access request comprises member identifiers of all of the members of the first group.

31. The computer program product of claim 30, wherein the computer executable instructions that send an Ad-hoc access request to the gateway according to at least one of the following features: a group member feature and a network feature of the members of the first group further comprises computer executable instructions that:
   determine that the members of the first group have high mobility according to the group member feature of the members of the first group; and
   send the Ad-hoc access request to the gateway, wherein the Ad-hoc access request comprises the member identifiers of all of the members of the first group.

32. The computer program product of claim 30, wherein after the sending an Ad-hoc access request to the gateway, the computer executable instructions further cause the group communication to:
   receive a second response from the gateway, wherein the second response comprises a aggregated access result of all of the members of the first group, and the second response is sent by the gateway after the gateway sends, according to the Ad-hoc access request, first access requests that request access to all members of the first group respectively to all the members of the first group and receiving, from all of the members of the first group, first responses respond to the first access request.

33. The computer program product of claim 29, wherein the computer executable instructions that send, to the gateway, a first group member access request that requests access to the members of the first group further comprise computer executable instructions that:
   create, according to at least one of the following features: a group member feature and a network feature of the members of the first group, a sub-group comprising all members of the first group on the gateway; and
   send a sub-group access request to the gateway, wherein the sub-group access request comprises a sub-group identifier of the sub-group.

34. The computer program product of claim 33, wherein the computer executable instructions that create, according to at least one of the following features: a group member feature and a network feature of the members of the first group, a sub-group comprising all members of the first group on the gateway, further comprise computer executable instructions that:
   determine that the members of the first group have low mobility according to the group member feature of the members of the first group; and
   create, on the gateway, the sub-group comprising all the members of the first group.

35. The computer program product of claim 33, wherein after the sending a sub-group access request to the gateway, the computer executable instructions further cause the group communication to:
   receive a fourth response from the gateway, wherein the fourth response comprises a aggregated access result of all sub-group members of the sub-group, and the fourth response is sent by the gateway after the gateway obtains sub-group member information of the sub-group according to the sub-group access request, sends a second access request that requests access to a corresponding sub-group members respectively to all sub-group members of the sub-group, and receives, from all sub-group member, third responses respond to the second access request.

36. The computer program product of claim 29, wherein before the receiving, from a network application, a group access request that requests access to a group, the computer executable instructions further cause the group communication to:
   receive, from the network application, a group creation request that requests creation of a group, wherein the group creation request comprises group member information of all group members in the group;
   create a group resource of the group according to the group creation request, wherein the group resource comprises the group member information and a group identifier of the group; and
   send a group creation response to the network application, wherein the group creation response comprises the group identifier.

37. The computer program product of claim 36, wherein after the creating a group resource of the group, the computer executable instructions further cause the group communication to:
   send, according to at least one of the following features: a group member feature and a network feature of all group members in the group, a sub-group creation request that requests creation of a sub-group to the gateway, wherein the sub-group creation request comprises first group member information of the members of the first group; and
   receive a sub-group creation response sent by the gateway, wherein the sub-group creation response comprises a sub-group identifier of the sub-group, and the sub-group creation response is sent by the gateway after the gateway creates a sub-group resource of the sub-group.

38. The computer program product of claim 29, further comprising computer executable instructions that cause the group communication to:
   receive a fifth response from the gateway, wherein the fifth response comprises an aggregated access result of all of the members of the first group.

39. The computer program product of claim 29, further comprising computer executable instructions that cause the group communication to:

send a group access response to the network application, wherein the group access response comprises an aggregated access result of all group members in the group.

* * * * *